March 6, 1956 E. M. IRWIN ET AL 2,737,543
WIRING HARNESS FOR AIRCRAFT ENGINES
Filed June 2, 1951
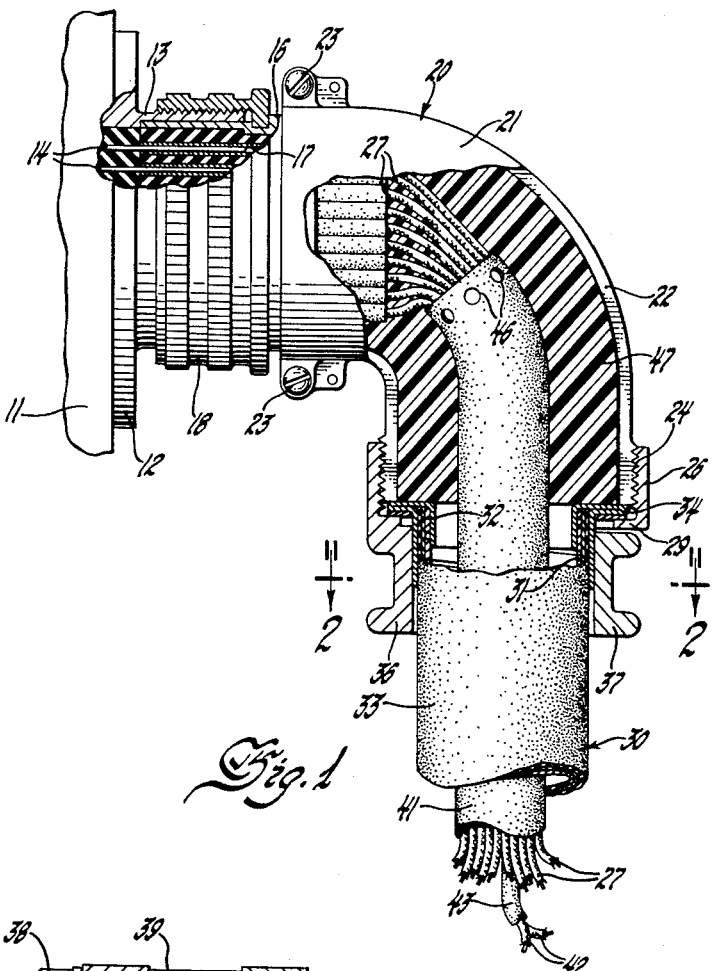
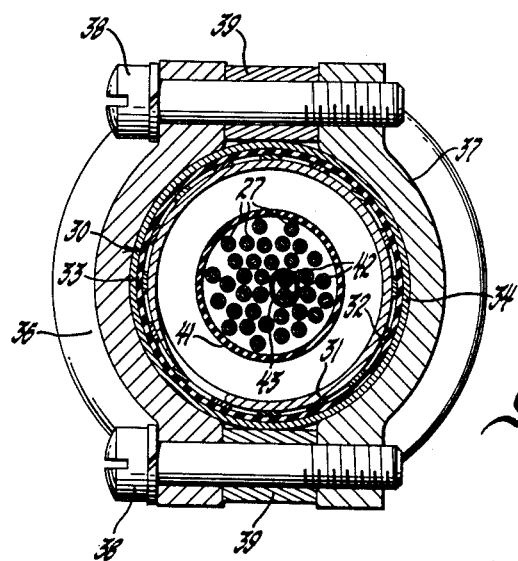
Inventors
Edmund M. Irwin,
Robert J. Wente &
Crayton H. Schwestka
By Willits, Helwig & Baillio
Attorneys

United States Patent Office 2,737,543
Patented Mar. 6, 1956

2,737,543

WIRING HARNESS FOR AIRCRAFT ENGINES

Edmund M. Irwin, Robert J. Wente, and Crayton Howe Schwestka, Indianapolis, Ind., assignors to General Motors Corporation, Detroit, Mich., a corporation of Delaware Application June 2, 1951, Serial No. 229,624

1 Claim. (Cl. 174—76)

Our invention relates to electrical wiring installations, and particularly to an installation or wiring harness especially adapted to withstand the conditions of aircraft engine installations.

Modern aircraft engines ordinarily require a very considerable electrical installation, largely for control and instrumentation. This wiring harness must, in general, be readily removable for servicing the engine. As a result, much of the wiring is carried by flexible conduits. The electrical installation must be of a very high degree of reliability and as light in weight as practicable. The installations are generally subjected to engine vibrations and frequently to high temperatures and other harmful environmental factors.

Previously known wiring harness for aircraft engines has suffered mechanical failures in service. A common type of failure is breaking away of the flexible conduit from the connector or junction box to which it is fixed. Other failures, such as breaking of conductors, have been due in some cases to failure of the conduit attachment. In other cases, breakage or detachment of the conductors is believed to have been due to vibration of the conductors within the fitting at the end of the conduit. Where shielded conductors are run in the same conduit with unshielded conductors, trouble has been experienced due to abrasion of the insulation on the unshielded conductors by the shielded wires.

Our invention is directed to a new system of wiring, or wiring harness, which greatly improves the strength, security, and reliability of the wiring installation. A principal object of our invention is to improve the performance and reliability of aircraft engines and of wiring installations in general. Another object of our invention is to provide an improved wiring harness or assembly. Other objects of the invention, and the advantages thereof, will be apparent to those skilled in the art from the succeeding detailed description of the preferred embodiment of the invention.

Referring to the drawings, Figure 1 is a view partially in elevation and partially in section of a portion of a wiring harness in accordance with the invention; and Figure 2 is a cross-sectional view of the same taken on the plane indicated in Figure 1.

Since an aircraft engine wiring installation of whatever degree of complexity ordinarily is composed of a number of separate conduits or cables running from one fixed point on the engine to another, the invention may be fully explained in terms of the structure at one end of a typical flexible conduit as illustrated in Figure 1. A junction box or other part of the fixed structure of an engine or the controls thereof is indicated at 11. On this structure is mounted one part 12 of a multipoint connector. The part 12 includes a threaded sleeve 13 and a number of insulated contact points 14 within the sleeve. The connector part 12 is adapted for connection with the mating connector element 16 which comprises a generally cylindrical body within which a plurality of sleeves 17 are mounted in a block of insulating material, the sleeves 17 being adapted to fit over the contact points 14. The two parts of the connector are held together by a collar 18 rotatable on the body 16 and threadable onto the sleeve 13. The connector member 16 is mounted on an elbow 20 formed of two similar parts 21 and 22, each of which forms one side or half of the elbow. The parts 21 and 22 are fixed together at the connector 16 by machine screws 23 and are threaded as indicated at 24 at the outer end, at which point the two halves are held assembled by a threaded collar 26.

A number of conductors 27 are fixed in known manner to the conducting sleeves 17, after which the two halves of the elbow 20 may be assembled, the parts 21 and 22 being formed with a rib or flange which enters a circumferential groove in the connector element 16.

The structure so far described is known and conventional in aircraft wiring and need not be described in further detail. The details of such structure may, of course, be varied, but the standard parts as described are well adapted for utilization in the harness of the invention.

A flexible conduit 30 extends from the elbow 20 to another end fitting (not shown) which may be of the same general type as that just described. The flexible conduit protects the conductors 27. This conduit may be of known type, comprising a flexible aluminum conduit 31 covered by wire braid 32, which is in turn sheathed by a closely fitting layer 33 of neoprene (polymerized chloroprene) or equivalent material. The end of the conduit 30 is fitted with a ferrule 34 which is swaged onto the conduit in known manner and is retained by the flange 29 of the collar 26.

Previously, the retention of the ferrule 34 by the flanged collar 26 has been relied upon for retention of the conduit. Because of the nature of the flexible conduit, it is difficult to mount the ferrule securely thereon, and, moreover, experience has shown that if the conduit does not pull out of the ferrule, the conduit may break at this point. The invention, therefore, includes further provision for retaining the conduit which does not rely upon the ferrule.

As illustrated in Figures 1 and 2, the conduit is gripped back of the ferrule between two arcuate clamping members 36 and 37, the member 36 being integral with the collar 26. The sections 36 and 37 of the conduit clamp are brought together tightly on the conduit by machine screws 38 threaded into one section of the clamp. In order to eliminate the possibility of damaging the conduit, spacer sleeves 39 are fitted over the screws to limit the clamping movement.

The conductors 27 are protected from abrasion against the inner shell 31 of the conduit by a thin-walled tube or sleeve 41 of a polyvinyl chloride sold under the name Vinylite, or a physically similar material. This material is flexible, smooth, and non-abrasive, and is very well adapted to protect the wires against scuffing against the walls of the conduit.

In general, most of the conductors 27 are insulated with a coating which is not hard or abrasive. However, in some cases one or more of the conductors is shielded. The shield ordinarily is a metal braid which may damage the insulation of other conductors. As illustrated, the conductors 42 which are shielded conductors, are enclosed in a small tube or sheath 43 of Vinylite or the like which isolates them from the other conductors.

The sheath 41 extends beyond the end of the conduit into the fitting 22, the end part of the sheath being provided with perforations as indicated at 46.

In order to eliminate vibration and resulting breakage of the wires or scuffing of the insulation thereon within the fitting 20, and to provide a gradual transition from the rigid fixation of the wires at the connector 16 to the flexible installation in the conduit 30, the fitting 22 is filled with a potting compound indicated at 47. This compound should be a slightly yielding or rubbery material which may be melted at a temperature that is not harmful to the installation and which, when it sets, is slightly resilient or yielding. A brittle potting compound is undesirable. Various substances are available which will be suitable for the purpose. One which has been used is a proprietary compound sold under the trade name Ethylmelt. A foam rubber vulcanized in place is suitable, but not particularly convenient to use. The fitting 20 is filled in a position inverted from that shown in the drawings, and the potting compound extends some distance into the sheath 41. The compound also flows through the holes 46 in the sheath, thus locking the sheath into the potting compound so that it will not withdraw from the fitting in service. As will be apparent, the walls of the holes 46 in the sheath define shoulders engaged by the potting compound to lock the sheath in place.

The manner in which the fitting is assembled should be apparent to those skilled in the art, but may be outlined briefly. The shielded conductors, if any, are threaded through the sheath 43. This sheath and the other conductors are run through the outer sheath 41. This assembly is then pulled through the flexible conduit and the conductors 27 are soldered or otherwise attached to the connector 16 in known manner. The fitting 20 is then assembled onto the connector and with the conduit end of the fitting turned upwardly and the conduit pulled slightly away from the fitting, it is filled with the potting compound. The collar 26 is then run up on the threaded end of the fitting to bring the conduit into position. The portion 37 of the clamp is put in place and the screws 38 are tightened, completing the assembly.

It will be obvious that the fitting 21 may be of other forms, and, insofar as the invention is concerned, need not be associated with a separable connector. The advantages of the invention in terms of secure retention of the conduit and protection of the conductors from breakage will be apparent to those skilled in the art.

The detailed description of the preferred embodiment of the invention is not to be considered as restricting the invention in any respect, since many modifications may be devised by the exercise of skill in the art within the scope of the invention.

We claim:

An electrical wiring assembly comprising, in combination, a flexible conduit; a rigid end fitting on the conduit; means for connecting the conduit to the fitting; a plurality of conductors in the conduit extending into the fitting; a flexible sheath for the conductors in the conduit for protecting the conductors from abrasion by the conduit and extending from the conduit into the fitting; and a resilient potting compound in the fitting into which the conductors and sheath extend; said potting compound serving to hold said sheath in position and to eliminate vibration of said conductors; the sheath being perforated to define a shoulder engaged by the potting compound for interlocking retention of the sheath by the potting compound against withdrawal of said sheath.

References Cited in the file of this patent

UNITED STATES PATENTS

| | | |
|---|---|---|
| 90,089 | Foucaut | May 18, 1869 |
| 508,295 | Fisher | Nov. 7, 1893 |
| 586,464 | Tobey | July 13, 1897 |
| 1,069,820 | Sessions | Aug. 12, 1913 |
| 1,115,447 | Liversidge | Oct. 27, 1914 |
| 1,211,153 | Hochstadter | Jan. 2, 1917 |
| 2,028,375 | Andre | Jan. 21, 1936 |
| 2,145,092 | Mitchell | Jan. 24, 1939 |

FOREIGN PATENTS

| | | |
|---|---|---|
| 71,621 | Switzerland | Feb. 1, 1916 |
| 616,017 | Great Britain | Jan. 14, 1949 |
| 645,797 | Great Britain | Nov. 8, 1950 |